United States Patent
Mahood

(10) Patent No.: US 6,462,146 B2
(45) Date of Patent: Oct. 8, 2002

(54) POLYCARBONATE BLENDS AND METHOD OF MAKING SAME

(75) Inventor: James Mahood, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/681,379

(22) Filed: Mar. 27, 2001

(65) Prior Publication Data

US 2002/0103309 A1 Aug. 1, 2002

Related U.S. Application Data

(60) Provisional application No. 60/254,397, filed on Dec. 8, 2000.

(51) Int. Cl.$^7$ .......................... C08L 69/00; C08G 64/06
(52) U.S. Cl. ........................ 525/469; 525/462; 528/204
(58) Field of Search ................................ 525/462, 469; 528/204

(56) References Cited

U.S. PATENT DOCUMENTS

| | | | |
|---|---|---|---|
| 4,129,546 A | * | 12/1978 | Axelrod |
| 4,948,871 A | | 8/1990 | Fuknoka et al. |
| 5,204,377 A | | 4/1993 | Fukawa et al. |
| 5,214,073 A | | 5/1993 | Fukawa et al. |
| 5,480,959 A | | 1/1996 | Schmidhauser |
| 5,580,951 A | | 12/1996 | Silva et al. |

FOREIGN PATENT DOCUMENTS

| EP | 0 982 340 | | 3/2000 |
|---|---|---|---|
| JP | 09-068817 | * | 3/1997 |

* cited by examiner

*Primary Examiner*—David J. Buttner
(74) *Attorney, Agent, or Firm*—Oppedahl & Larson LLP

(57) ABSTRACT

Copolymers of BPA and menthane bisphenols such as BPT1 and BPT2 can be used as a compatabilizer to allow the formation of homogeneous blends of BPA with menthane bisphenol polycarbonates such as poly-BPT1 or poly-BPT2 or copolymers thereof. Thus, a compatible polycarbonate blend is made by combining a bisphenol A polycarbonate, a menthane bisphenol polycarbonate and a BPA/menthane bisphenol copolymer compatibilizer, and mixing the combined materials to form a blend. The compatibilizer may contain one or more species of menthane bisphenol. In a specific example, BPT1 and BPT2 are used in the compatabilizer in a ratio, BPT1/BPT2, in the range of 70/30 to 10/90, preferably less than or equal to 1/1, for example around 30/70. By adjusting the relative amounts and the properties of the bisphenol A polycarbonate and the menthane bisphenol polycarbonate, the glass transition temperature and the toughness of the blend can be selected.

19 Claims, 2 Drawing Sheets

POLYCARBONATE BLENDS AND METHOD OF MAKING SAME

CROSS REFERENCE TO RELATED APPLICATIONS

This application claims the benefit of US Provisional Application No. 60/254,357, filed Dec. 8, 2000, which application is incorporated herein by reference. This application is related to U.S. patent applications Ser. Nos. 09/681,377 and 09/681,378 filed concurrently herewith, all of which are incorporated herein by reference.

BACKGROUND OF INVENTION

This application relates to compatabilized polycarbonate blends and to a method of making same.

Polycarbonates are a well known class of high impact resistant thermoplastic resins characterized by optical clarity, high ductility as well as other advantageous properties. They are frequently employed as lenses and windows as a result of their transparency. Bisphenol A (BPA) polycarbonate is the predominant commercially available resin of this type. It is derived from 2,2-bis(4-hydroxyphenyl) propane and ordinarily has a glass transition temperature of about 150° C.

It is of increasing interest to prepare polycarbonates which, while retaining the ductility of BPA, have higher glass transition temperatures and are therefore more resistant to softening when heated. Polycarbonates possessing increased glass transition temperatures are very desirable, for instance, in the automotive and aircraft industries. Particularly, they may be used in the preparation of automotive headlamp lenses which are becoming smaller in size and characterized by closer proximity of the lenses to the heat-generating light source.

Current approaches to high heat polycarbonate involve polymerizing BPA with a monomer with that increases the copolymer glass transition temperature (Tg). This improvement usually comes at the expense of other polymer properties. For example, Bayer has commercialized a family of copolymers based on Bisphenol I, which provide higher Tg at the expense of reduced ductility. Bayer APEC DP9-9340 resin gives a Tg of 177 E C and a 23 E C notched izod impact of 6 ft-lb/in, as compared to a Tg of 150° C. and a 23° C. notched izod impact of 14–16 ft-lbs/in for BPA homopolymer.

U.S. Pat. No. 5,480,959 disclosed substantially pure bisphenols; in particular, 4-[1-[3-(4-hydroxyphenyl)-4-methylcyclohexyl]-1-methylethyl]phenol (hereinafter referred to as BPT-1) and 4,4'-[1-methyl-4-(1-methylethyl)-1,3-cyclohexandiyl]bisphenol (hereinafter referred to as BPT-2). These materials can be used to make homopolycarbonates that possess increased glass transition temperatures on the order of about 198° C. when employing BPT-1 and about 249° C. when employing BPT-2. Unfortunately, these materials do not have the toughness of BPA.

A copolymer of BPT1 and BPA (35:65 mol %) was reported to have a glass transition temperature of 171° C. and a 23° C. notched Izod impact strength of about 3.8 ft-lbs/in. The production of copolymers to attain specific characteristics is not optimum, however, because it requires a separate manufacturing run for each type of product. This increases the cost. Thus, a preferred approach to the manufacture of products with a spectrum of characteristic properties is to have a limited number of feedstock polymers which can be blended to arrive at mixtures with the desired properties. In the case of BPA, one seeming option would be mixing BPA with BPT1 or BPT2 to arrive at blends having high Tg values. This approach has not worked, however, because BPA. is not miscible with BPT1 or BPT2.

It would be desirable to have a method for modifying the thermal characteristics of polycarbonate to increase the glass transition temperature, that does not result in the a significant degradation of the impact properties of the polymer, and which can be carried out using blends of a limited number of feedstock polymers.

SUMMARY OF INVENTION

It has now been determined that copolymers of BPA and menthane bisphenols such as BPT1 and BPT2 can be used as a compatabilizer to allow the formation of homogeneous blends of BPA with menthane bisphenol polycarbonates such as poly-BPT1 or poly-BPT2 or copolymers thereof. Thus, the present invention provides a method for making a compatible polycarbonate blend comprising the steps of (a) combining a bisphenol A polycarbonate, a menthane bisphenol polycarbonate and a BPA/menthane bisphenol copolymer compatabilizer, and(b) mixing the combined materials to form a blend. The compatabilizer may contain one or more species of menthane bisphenol. In one embodiment, BPT1 and BPT2 are used in the compatabilizer in a ratio, BPT1/BPT2, in the range of 70/30 to 10/90, preferably less than or equal to 1/1, for example around 30/70. By adjusting the relative amounts and the properties of the bisphenol A polycarbonate and the menthane bisphenol polycarbonate, the glass transition temperature and the toughness of the blend can be selected.

DETAILED DESCRIPTION

The present invention provides a compatabilizer composition suitable for use in making blends of bisphenol A polycarbonate polymers and menthane bisphenol polycarbonate polymers, polycarbonate blends which incorporate these polymers and the compatibilizer, and a method for making such blends.

Figure 1:
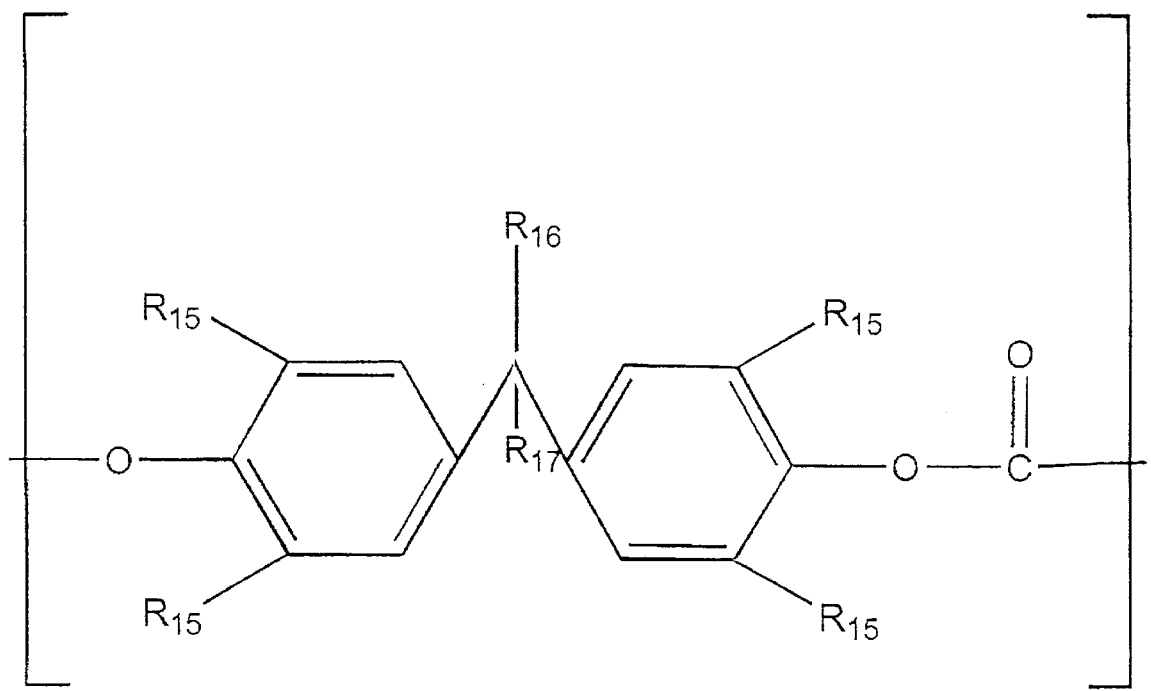
FIG. 1 shows the structure of a type of phenol useful in making polycarbonates in accordance with the invention.
Figure 2A:
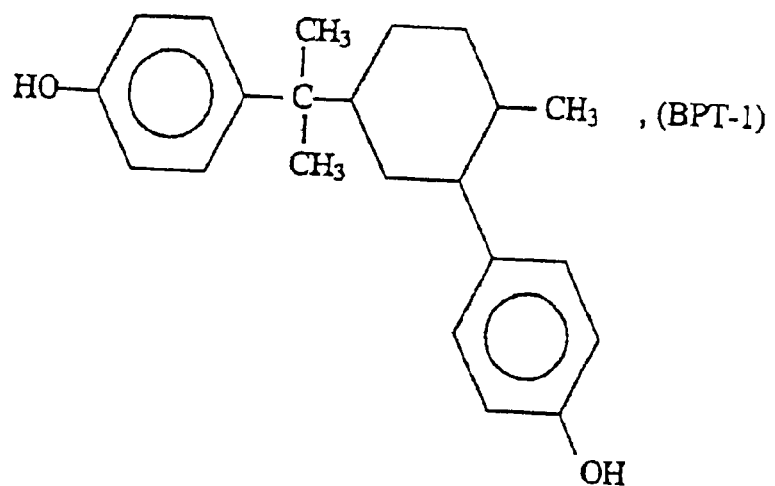
FIGS. 2A and B shows the structures of BPT-1 and BPT-2, respectively.
Figure 2B:
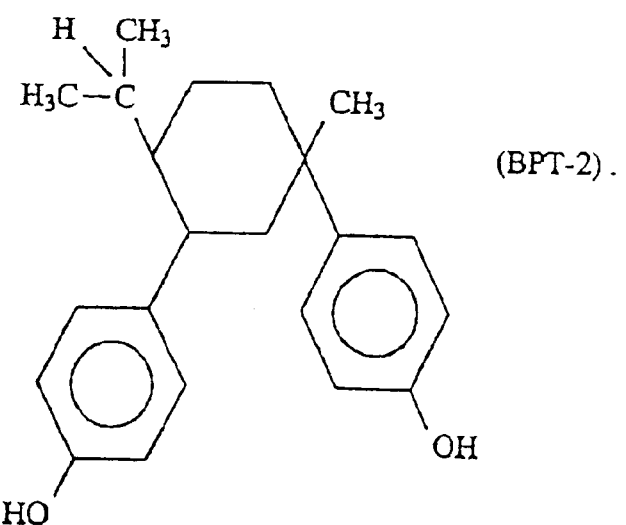

As used in the specification and claims of this application, the term "bisphenol A polycarbonate polymer" refers to homopolymers of bisphenol A and to copolymers of bisphenol A and modifying comonomers selected to alter the properties of the bisphenol A polycarbonate polymer. Such comonomers include additional dihydric phenol comonomers known for use in the production of polycarbonates, including but not limited to those phenols which can be employed in the synthesis of polycarbonates having the general formula shown in FIG. 1, where $R_{15}$ is selected independently from the group consisting of H and $C_1$–$C_3$ alkyl, and $R_{16}$ and $R_{17}$ are independently $C_1$–$C_6$ alkyl or aryl. In general, these additional comonomers will be limited to amounts of less than 20% by weight.

The term "menthane bisphenol polycarbonate polymers" refers to homopolymers or copolymers of menthane bisphenols. Menthane bisphenols have the general formula phenol—(methyl, isopropyl-cyclohexane)—phenol. Examples of menthane bisphenols are set forth in U.S. Pat. No. 5,480,959. BPT1 and BPT2 are specific examples of menthane bisphenols which may be incorporated in the menthane bisphenol polycarbonate polymer in the composition and method of the present invention.

The compatabilizer of the invention is a copolymer of BPA and one or more species of menthane bisphenol. In one embodiment, the compatabilizer comprises copolymerized residues of BPA, BPT1 and BPT2, in a ratio, BPT1/BPT2, in the range of 70/30 to 10/90, preferably less than or equal to 1/1, for example around 30/70. (It should be noted that BPT1 and BPT2 are isomers and that they therefore have the same molecular weight. Thus, the ratio of BPT1 to BPT2 is the same, whether it is on a molar or weight basis). The amount of BPA in the compatabilizer is at least 20 mol %, for example 20 to 75% and preferably 35 to 50 mol %.

In accordance with the method of the invention, the BPA polycarbonate polymer, the menthane bisphenol polycarbonate polymer and the compatabilizer are combined and mixed to form a blend. This is suitably done at elevated temperature, for example in an extruder. In the blends of the invention, the relative amounts of the components are selected to provide the desired final values for Tg and toughness. The compatabilizer is generally present in an amount of 20 to 50 mol %. Higher amounts of compatabilizer tend to increase Tg and decrease toughness. The BPA polycarbonate polymer is generally present in an amount of from 25 to 50 mol %. Higher amounts of BPA polycarbonate polymer tend to decrease Tg and increase toughness. The menthane bisphenol polycarbonate polymer is generally present in an amount of from 25 to 50 mol %. Higher amounts of menthane bisphenol polycarbonate polymer tend to increase Tg and decrease toughness.

The invention will now be further described with reference to the following, non-limiting examples.

COMPARATIVE EXAMPLE

Bisphenol A polycarbonate (homopolymer) and a menthane bisphenol polycarbonate (70/30 BPT2/BPT1) were dissolved in 1:2, 1:1 and 2:1 ratios to give 10% solutions in methylene chloride. The clear solutions were used to cast films, and the films were dried overnight in air. DSC analysis of all three films showed two Tg values, at 153° C. and 223° C., indicating inhomogeneity in the films.

EXAMPLE 1

Bisphenol A (29.4 g, 0.13 mol) and a 30/70 blend of BPT1/BPT2 (41.6 g, 0.13 mol) were charged to a 2 L agitated reactor along with methylene chloride (500 L), water (300 L), triethylamine (0.5 ml) and p-cumylphenol (1.61 g). Phosgene (30 g, 0.3 mol) was added at 2 g/min rate while the pH was held at 10.0–10.50 by controlled addition of a 50% caustic solution. The resulting polymer solution was separated from the brine layer, washed with dilute HCl solution, and then washed with water until the level of titratable chloride was less than 3 ppm. The polymer solution was slowly added to hot water, and the precipitated resin was dried at 115° C. for 6 hours. The resulting resin was used as a compatabilizer (50% BPA/50% menthane bisphenol) in accordance with the invention.

EXAMPLE 2

The experiment of the comparative example was repeated, but with the inclusion of the compatabilizer of Example 1. Three mixtures in methylene chloride were prepared in which the ratios of compatabilizer/BPA polycarbonate/menthane bisphenol polycarbonate were 2:1:2, 1:2:1, 1:1:1 and 1:1:2 by weight. Tg values for the films were determined by DSC. In each case, a single Tg value was obtained. The values were 185° C., 161° C., 196° C. and 206° C. for the three blends, respectively. A 1:1 BPA:menthane bisphenol blend exhibited to values of Tg (155° C. and 210° C.) as did a 2:9:9 compatabilizer/BPA/menthane bisphenol blend (Tg=155° C. and 209° C.). The value of 161° C. is lower by about 15° C. than would be predicted based on Tg of the individual components, but it is reproducible.

I claim:

1. A polycarbonate blend comprising (a) a biphenol A polycarbonate polymer;

(b) a menthane bisphenol polycarbonate polymer; and (c) a compatabilizing copolymer comprising residues of bisphenol A and one or more species of menthane bisphenol, wherein the components (a), (b) and (c) are each different from one another in composition.

2. The blend of claim 1, wherein the menthane bisphenol residues in the compatabilizing copolymer comprise residues of 4-[1-[3-(4-hydroxyphenyl)-4-methylcyclohexyl]-1-methylethyl]phenol (hereinafter referred to as BPT1) and 4,4'-[1-methyl-4-(1-methylethyl)-1,3cyclohexandiyl] bisphenol (hereinafter referred to as BPT2).

3. The blend of claim 1, wherein the BPT 1 and BPT2 are present in a ratio, BPT1/BPT2, in the range of 70/30 to 10/90.

4. The blend of claim 1, wherein the ratio BPT1/BPT2 is less than 1/1.

5. The blend of claim 1, wherein the compatabilizing copolymer comprises 20 to 75 mol % bisphenol A residues, and 80 to 25 mol % of methane bisphenol residues.

6. The blend of claim 3, wherein the compatabilizing copolymer comprises 35 to 50 mol % bisphenol A residues.

7. The blend of claim 1, wherein the blend comprises 20 to 50% by weight of the compatabilizing copolymer.

8. A method for making a compatible polycarbonate blend comprising the steps of:

(a) combining a bisphenol A polycarbonate polymer, a menthane bisphenol polycarbonate polymer, and a compatabilizing copolymer, wherein the bisphenol A polycarbonate polymer, menthane bisphenol polycarbonate polymer, and compatabilizing copolymer are different from one another in composition; and (b) mixing the combined materials to form a homogeneous blend; wherein the compatabilizing copolymer comprises residues of bisphenol A and one or more species of menthane bisphenol.

9. The method of claim 8, wherein the menthane bisphenol residues comprise, 4-[1-[3-(4-hydroxyphenyl)-4-methylcyclohexyl]-1-methylethyl]phenol (hereinafter referred to as BPT1) and 4,4'-[1-methyl-4-(1-methylethyl)-1,3-cyclohexandiyl]bisphenol (hereinafter referred to as BPT2).

10. The method of claim 9, wherein the BPT1 and BPT2 residues are present in the compatabilizing copolymer in a ratio, BPT1/BPT2, in the range of 70/30 to 10/90.

11. The method of claim 9, wherein the ratio BPT1/BPT2 is less than or equal to 1/1.

12. The method of claim 9, wherein the compatabilizing copolymer comprises 20 to 75 mol % bisphenol A residues, and 80 to 20 mol % of menthane bisphenol.

13. The method of claim 12, wherein the compatabilizing copolymer comprises 35 to 50 mol % bisphenol A residues.

14. The method of claim 9, wherein the methane bisphenol polycarbonate polymer is a 70/30 copolymer of BPT2 and BPT1.

15. The method of claim 8, wherein the blend comprises 20 to 50% by weight of the compatabilizing copolymer.

16. A compatabilizing copolymer comprising residues of bisphenol A, 4-[1-[3-(4-hydroxyphenyl)-4-methylcyclohexyl]-1-methylethyl]phenol (hereinafter referred to as BPT-1) and 4,4'-[1-methyl-4-(1-methylethyl)-1,3-cyclohexandiyl]bisphenol (hereinafter referred to as BPT-2), wherein BPT1 and BPT2 residues are present in the compatabilizing copolymer in a ratio, BPT1/BPT2, in the range of 30/70 to 10/90.

17. The copolymer of claim 16, wherein the compatabilizing copolymer comprises 35 to 50 mol % bisphenol A residues.

18. The copolymer of claim 16, wherein the ratio, BPT1/BPT2 is about 3/7.

19. The copolymer of claim 16, wherein the compatabilizing copolymer comprises 20 to 75 mol % bisphenol A residues, and 80 to 25 mol % of BPT1 and BPT2 residues combined.

* * * * *